United States Patent Office 3,018,280
Patented Jan. 23, 1962

3,018,280
SEEDMEAL PROTEIN COMPOSITION
Harold K. Salzberg and Milton R. Simonds, Bainbridge, N.Y., assignors to The Borden Company, a corporation of New Jersey
No Drawing. Filed July 8, 1958, Ser. No. 747,122
4 Claims. (Cl. 260—119)

This invention relates to a seedmeal protein composition and the process of making it.

The invention is particularly useful in separating soy protein from the other materials of defatted soybean meal, the term meal including flakes and other subdivided forms of soybeans. A suitable meal is the defatted flake material described in Kirk and Othmer's Encyclopedia of Chemical Technology, volume 12, pages 695 and 698. The conventional protein separation process includes defatting soybean meal as by pressing, solvent extraction, or both; then dissolving the soy protein in an aqueous alkaline solution; filtering the resulting protein extract from the remaining fibrous material; and adding acid in amount to lower the pH of the filtrate to approximately the isoelectric point for the soy protein.

A difficulty arises in that the soy protein so precipitated is a soft fine curd that packs in a filter cake and makes the filtration exceedingly slow.

The present invention provides a process and composition that accelerates the filtration of the precipitated seed protein material so that, in representative runs, the time required for the filtration is reduced to about half or a fourth that required for the filtration in the conventional process.

Briefly stated, our invention comprises the process of mixing casein with the seed material at some stage in advance of the precipitation of the protein in the protein extract therefrom, coprecipitating the added casein and the seed protein, and then filtering the coprecipitated material, the result being rapid filtration.

The invention includes also the coprecipitated protein composition showing, on its surface, properties of casein.

The protein to be separated is ordinarily soy protein although it may be peanut, cottonseed, or like protein contained in meal of those seeds. In general, the protein must be one that is soluble in aqueous acid or alkali solutions, has the isoelectric point within the range 4.4–4.7, approximately that for casein, and is precipitated by bringing the pH approximately to the isoelectric point of casein so that the two proteins are coprecipitated. We start, therefore, with soybean, peanut, cottonseed, or cornmeal.

As the curd modifying composition which improves the filtration rate we know of no material as satisfactory as casein. Commercial acid precipitated casein, i.e., from cow's milk, is both satisfactory and economical and is the kind that we use. The casein may be dissolved in water in advance or mixed as a dry powder into the seedmeal or into the protein extract.

As the extracting medium for dissolving the seedmeal protein, we use an aqueous solution of an alkali although for some purposes an aqueous solution of an acid may be substituted. The medium must have a pH substantially outside the isoelectric range for the protein, so that the protein will dissolve.

When the alkaline medium is used, the dissolving alkali is ordinarily sodium, potassium or other alkali metal hydroxide, calcium hydroxide, ammonium hydroxide, or an alkyl substituted ammonium such as aqueous solutions of methyl amine, ethyl amine, mono-, di-, or triethanolamine and also tetraethanol ammonium hydroxide. The selected alkali is dissolved in water either in advance or at the time of use.

When the acid extracting medium is used, then the acid is a solution of a water soluble acid capable of establishing, in water and in contact with the seedmeal being processed, a pH substantially lower than the isoelectric point of the protein to be extracted. Examples of acids that may be used are hydrochloric, phosphoric, sulfurous, nitric, formic, acetic, lactic and glycolic.

The same acids, or combinations thereof used in sequence, may be used for the step of precipitation from an alkaline extract. For such use, sulfur dioxide is particularly satisfactory.

Proportions of alkali or acid in the dissolving medium are those that are usual in this industry. Thus alkali, when the extraction is made under alkaline conditions, is in amount to establish the pH at about 8–10. Suitable proportions of acid for the acid extraction are those making the pH about 1.5–3.0 and normally 1.5–2.5.

As to conditions of operation, we find particularly satisfactory results when the seedmeal is milled additionally during the protein dissolving, i.e., extraction step. Thus the defatted seedmeal is mixed with the protein dissolving solution and is subjected to additional milling, wet milling continuously during a substantial part and suitably all of the period of contact with the extracting solution, as by stone burr or any usual colloidal mill of the liquid shear type. With such additional milling during the extraction step, we have increased the yield of recovered protein by 2.5–5 lbs. for 100 of the seedmeal. The additional milling is omitted when such improved yield is not an object to be accomplished.

The casein is added to the seedmeal protein at any stage in the operation in advance of the precipitation of the protein. Thus the casein may be introduced, in powdered form, for instance, into the defatted seedmeal. Introducing the casein at an earlier stage is not necessary or recommended. In alternative procedures, the casein is introduced into the mixture during the extraction step or into the filtered protein extract. In any case, the casein must remain in contact with water long enough to become dissolved and thoroughly and intimately dispersed with the seedmeal protein before the later precipitation is effected. If desired, the casein may be dissolved in advance in a little water containing some added alkali (or acid) and the solution of casein then admixed at the selected stage of the process.

If the alkali extraction is used, as is ordinarily the case in our process, then the precipitation is effected by the addition of acid in amount to bring the pH of the filtered protein extract, including the casein, approximately to the isoelectric point for the seedmeal protein. If, on the other hand, the original extraction is effected by an acid solution, then the precipitation is brought about by adding an alkali in amount to establish approximately the same isoelectric condition. Since the pH of precipitation of proteins ordinarily extends over a moderate range, the operator working within this range may vary the final pH slightly, as over a range 0.3 or so, the exact end point in the addition of the acid depending in part on observation of the manner in which the curd breaks and settles from the remaining liquid phase (whey).

The separation of the coprecipitated seedmeal protein and casein is effected best by filtration. Thus filtration may be accomplished by the use of a rotary vacuum filter, pressure filter, basket centrifuge, decantation, or a combination of these techniques. The filtered material may be washed on the filter in usual manner. The material is then removed and dried by any conventional method for soy protein, although the product may be used in wet condition if desired.

The invention will be further illustrated by description in connection with the following specific examples of the practice of it. In these examples and elsewhere herein proportions are expressed as parts by weight unless specifically stated to the contrary.

Example 1

| | | |
|---|---|---|
| Water | gal | 760 |
| Soybean meal, defatted | lbs | 800 |
| NaOH (50%) | lbs | 15 |

A slurry is made of the above composition, of pH 8.8, brought to a temperature of 120° F., and held at that temperature for 15 minutes. The outlet valve of the mixing tank is then opened and the slurry passed slowly through a colloidal mill, for wet mill disintegration, and then through a series of revolving cylindrical reels fitted with 80-mesh stainless steel screen, in order to separate a coarse fibrous fraction of the make-up slurry from the protein solution.

The insertion of the wet milling operation, after make-up and before the coarse screening to remove fibrous materials, provides fresh surfaces of the particles of the soybean meal to the extracting action of the alkaline solution. The result is improvement of the ultimate yield of protein. In one series of runs, the yield of soy protein was increased from the normal yield of 22.5 lbs. to 25.0 lbs. from 100 lbs. of meal, by use of a colloidal mill, and to 27.5 lbs. by use of a stone burr mill, all equipment and techniques being the same throughout except for the milling with the extracting solution.

The more complete separation of fibrous material that remains in the alkaline extract, after removal of the coarse fibers on the reels, is effected with a high-speed basket centrifuge. This removes even the finely dispersed insoluble material, primarily fibers, to yield a clear solution of protein which, upon subsequent curding, will be free of fibrous material.

Into this clear screened and centrifuged protein solution 6 lbs. casein powder are introduced and stirred until the casein is dissolved. The whole is then acidified, to coagulate the protein. This is accomplished conveniently with sulfur dioxide gas in amount to reduce the pH of the solution to the isoelectric point of the soy protein, i.e., to the range of 4.4–4.7, practically the same as for casein. The particles so obtained by the resulting coprecipitation are filtered on a vacuum drum filter. The filter cake is washed, removed to a curd breaker, and dried.

After being ground to a suitable mesh size, the protein so produced is useful in the bonding of pigments for paper coating or in paints, protein enrichment of foods, or a number of applications wherein soy protein or casein is used. In spite of the low proportion of casein, actually about 3% of the soy protein, the casein is so associated with the surfaces of the particles of soy protein as to modify the properties of the product, in the direction of casein, out of proportion to the amount of casein present.

One such modification is illustrated by a series of preparations on a semi-commercial scale, in which casein from cow's milk in amounts of from 6–40 lbs. was added to the soy protein solution from 800 lbs. of soybean meal. This range corresponds to about 3%–20% of casein protein on the weight of protein recoverable from the meal by conventional extraction. Proportions of casein added, yields of total protein and of soy protein, and the filtration times, for the whole batches, are compared with each other and with a run outside the invention in which no casein was added.

| Casin Added, lbs. | Yield of Total Proteins, lbs. | Net yield of Soy Protein, lbs. | Filtration Time, hrs. |
|---|---|---|---|
| 0 | 197 | 197 | 12 |
| 6 | 210 | 204 | 3 |
| 20 | 228 | 203 | 6 |
| 40 | 236 | 196 | 6 |

The addition of casein in amounts up to 20 lbs. per 800 lbs. of soybean meal improved the yield of total protein recovered by an amount significantly greater than the amount of casein added. A very important effect of the casein addition was production of a firm curd, fast settling in the curding tank, and so rapid in filtration as to reduce the time required for filtration to about a fourth to a half that required for the run with no casein.

As an alternative to the direct process of separating the protein by acidification to the isoelectric point, the coprecipitated soy protein and casein may be redissolved by the addition of excess acid and then curded again by increasing the pH of the solution to the isoelectric point with alkali, the precipitate so obtained being then filtered and the cake washed and dried.

In another embodiment of this example, the casein is added to the soybean meal and dissolved in the water of the original formula before the soy protein therein is separated from the fibrous material; otherwise the procedure is unchanged.

Example 2

The procedure of Example 1 is followed except that the mixture undergoing extraction is as follows: Water 760 gals., soybean meal 800 lbs., and hydrochloric acid solution (37°) 20 lbs., and the coprecipitation is effected by the addition of ammonia, introduced either as a gas or as ammonium hydroxide solution, in amount required to establish a pH finally of 4.4–4.7. In a variation of this example, an equivalent proportion of diluted nitric acid of concentration about 5% is substituted for the hydrochloric acid. An advantage of this substitution is the fact that the whey remaining, after filtering out the coprecipitated proteins, is particularly useful as fertilizer, suitably after evaporation of water therefrom.

Example 3

The procedure and proportions of Examples 1 and 2 separately are followed except that the soybean meal there used is replaced by an equal weight of any of the other seedmeals disclosed herein, the seedmeals in each instance being used in deoiled (defatted) condition.

Example 4

The procedure and proportions of Examples 1–3 are used except that the alkali in the aqueous extraction medium is replaced by any of the other alkalies disclosed herein, in proportion to establish a pH of 8.5–9.5.

Example 5

When only increase of the yield of recovered seedmeal protein is sought, without any improvement of the filtration rate of the curd or modification of the properties of the surfaces of the particles of the protein, then the procedure and compositions of Examples 1–4 are used except that the casein is omitted. In all cases, the wet milling of the meal in contact with the extracting solution is used, to improve the yield of the protein recovered.

It is to be understood that it is intended to cover all changes and modifications of the examples of the invention herein chosen for the purpose of illustration which do not constitute departures from the spirit and scope of the invention.

We claim:

1. In separating a protein from non-proteins, the process which comprises stirring and dispersing about 3–20 parts by weight of cow's milk casein in 100 parts dry weight of an aqueous extract of protein of a meal selected from the group consisting of soybean, peanut, cottonseed and corn meals and containing an admixed alkali in amount to establish the pH at least as high as about 8 and above the isoelectric point of the said protein, introducing into the resulting composition an acid in amount to lower the pH to the said isoelectric point within the range about 4.4–4.7, whereupon the said protein and the casein coprecipitate, and filtering the coprecipitate from the remaining liquid.

2. The process of claim 1, the said meal being defatted soybean meal.

3. In dissolving soy protein from defatted soybean meal, the process which comprises mixing the defatted meal with an aqueous protein-extracting alkali solution in amount to raise the pH of the mixed meal and solution to at least 8, milling the meal to more finely divided condition in contact with the alkali solution, and filtering fibrous material from the resulting product, the milling serving to expose fresh surfaces of the soybean meal continuously to the action of the alkali solution and the extraction of the protein from the meal being thus promoted.

4. The process of claim 1, the said aqueous extract of protein being the product of mixing the soybean meal in defatted condition with aqueous alkali solution in the amount to establish the pH of the resulting mixture at least as high as 8 and milling the said meal to more finely divided condition in contact with the alkali solution.

References Cited in the file of this patent

UNITED STATES PATENTS

| | | |
|---|---|---|
| 2,078,962 | Miller | May 4, 1937 |
| 2,529,477 | Arthur | Nov. 14, 1950 |

OTHER REFERENCES

Markley: Soybean and Soybean Products, vol. I (1950), page 308, pages 310–312, page 275, Interscience Pub. Inc., New York.